US005672959A

United States Patent [19]

Der

[11] Patent Number: 5,672,959

[45] Date of Patent: Sep. 30, 1997

[54] LOW DROP-OUT VOLTAGE REGULATOR HAVING HIGH RIPPLE REJECTION AND LOW POWER CONSUMPTION

[75] Inventor: Lawrence Der, Milpitas, Calif.

[73] Assignee: Micro Linear Corporation, San Jose, Calif.

[21] Appl. No.: 631,403

[22] Filed: Apr. 12, 1996

[51] Int. Cl.$^{6}$ .................................................. H02M 3/337

[52] U.S. Cl. .................................................. 323/273

[58] Field of Search .................................. 323/273, 265, 323/267, 268, 272, 224, 222, 289, 282; 363/71

[56] References Cited

U.S. PATENT DOCUMENTS

| | | | |
|---|---|---|---|
| 4,731,574 | 3/1988 | Melbert | 323/275 |
| 4,736,151 | 4/1988 | Dishner | 323/224 |
| 4,920,309 | 4/1990 | Szepesi | 323/269 |
| 5,412,308 | 5/1995 | Brown | 323/267 |
| 5,461,302 | 10/1995 | Garcia et al. | 323/222 |

OTHER PUBLICATIONS

"Step–Up/Step Down Converters Power Small Portable Systems", Bruce D. Moore, EDN, pp. 81–82, Feb. 3, 1994.

*Primary Examiner*—Aditta Krishnan

*Attorney, Agent, or Firm*—Haverstock & Associates

[57] ABSTRACT

A low drop-out regulator circuit that has high ripple rejection and low power consumption. A first local feedback loop is a high-speed, high-bandwidth loop that actively rejects noise from the input source to the regulator. A second feedback loop, having lower speed and a correspondingly lower bandwidth than the first feedback loop, regulates the output voltage. Each feedback loop is separately optimized for its respective bandwidth requirements and, therefore, the regulator is highly efficient. The first feedback loop comprises an amplifier and a pair of PMOS transistors configured as a current mirror with current gain. The first feedback loop generates a first current for charging an output capacitor. Feedback ensures that the first current is proportional to a second current generated by the second feedback loop while rejecting noise from the input source. The second feedback loop comprises a transconductance amplifier that controls the second current with feedback such that the first current charges the output capacitor to the desired output voltage level. The second loop has a lower bandwidth than the first loop because the bandwidth of the second feedback loop is dominated by a relatively large output capacitance and compensation capacitance, while the bandwidth of the first feedback loop is dominated by the relatively small gate capacitances of the pair of transistors and a relatively small compensation capacitance.

24 Claims, 6 Drawing Sheets

LOW DROP-OUT VOLTAGE REGULATOR HAVING HIGH RIPPLE REJECTION AND LOW POWER CONSUMPTION

FIELD OF THE INVENTION

The invention relates to the field of low drop-out voltage regulators. In particular, the invention relates to the field of low drop-out voltage regulators having high ripple rejection and low power consumption.

BACKGROUND OF THE INVENTION

FIG. 1 shows a schematic diagram of a conventional low drop-out voltage regulator. A switching regulator or other voltage source is coupled to supply power to a node Vin. A source of a PMOS transistor MP1 is coupled to the node Vin. A drain of the transistor MP1 forms a node Vout and is coupled to a first terminal of a resistor R1, to a first terminal of a capacitor C and to a first terminal of a load RL. The capacitor C has an effective series resistance, shown as a resistor Resr coupled in series with the capacitor C. A second terminal of the resistor R1 is coupled to a non-inverting input to an error amplifier EAMP and to a first terminal of a resistor R2. A second terminal of the resistor R2 forms a ground node and is coupled to a second terminal of the capacitor C and to a second terminal of the load RL. An inverting input to the amplifier EAMP is coupled to a reference voltage level Vr. An output of the amplifier EAMP is coupled to a gate of the transistor MP1. The amplifier MP1 is generally compensated with a compensation capacitor (not shown) to ensure feedback loop stability.

The circuit shown in FIG. 1 employs feedback to regulate the output voltage Vout, across the capacitor C. The amplifier EAMP controls the gate of the transistor MP1 such that the voltage at the non-inverting input to the amplifier EAMP is equal to the reference voltage level Vr at the inverting input to the amplifier EAMP. The resistors R1 and R2 comprise a voltage divider. Thus, the output voltage Vout is proportional to the voltage at the non-inverting input to the amplifier EAMP.

Noise present at the input node Vin will be suppressed so long as the frequency of the noise is low enough to be within the bandwidth of the feedback loop. The bandwidth of the feedback loop is limited, however, due to the relatively large output capacitor C and the compensation capacitance of the amplifier EAMP. Thus, the feedback loop may not respond quickly enough to block high frequency noise. These higher frequencies will be passed directly through the transistor MP1, causing ripple in the output voltage Vout, attenuated only by a voltage divider comprised of the effective series resistance Resr and the on-resistance of the transistor MP1. It is well known that voltage ripple can adversely effect the operation of many different loads.

A switching regulator is commonly coupled to the node Vin to provide power to the circuit shown in FIG. 1. It is well known, however, that switching regulators tend to introduce high frequency noise into the circuit. Thus, to prevent this high frequency noise from being passed to the load RL, the bandwidth of the feedback loop may be increased by increasing the response time of the amplifier EAMP or by increasing the voltage drop across the transistor MP1. Both of these alternatives, however, reduce efficiency and increase the power consumed by the circuit. It is well known that increasing power consumption has drawbacks. For example, power consumption creates heat, which can damage circuit components if not dissipated properly. Also, in battery powered devices, increasing power consumption shortens periods of use between battery recharges. Thus, in the prior art, a trade-off must be made between ripple rejection requirements and power consumption requirements.

Therefore, what is needed is a low drop-out regulator that rejects ripple caused by high frequency noise and that does not consume excessive power.

SUMMARY OF THE INVENTION

The invention is a low drop-out regulator circuit having high ripple rejection and low power consumption. A first local feedback loop is a high-speed, high-bandwidth loop that actively rejects noise received from the power source to the regulator. A second feedback loop, having lower speed and a correspondingly lower bandwidth than the first feedback loop, regulates the output voltage. Each feedback loop is separately optimized for its respective bandwidth requirements and, therefore, the regulator is highly efficient.

The first feedback loop is responsible for actively attenuating noise from the input source. It comprises an amplifier and a pair of PMOS transistors configured as a current mirror with current gain. The first feedback loop generates a first current for charging an output capacitor. Feedback ensures that the first current is proportional to a second current generated by the second feedback loop. Although the amplifier of the first feedback loop is compensated to ensure stability, the first feedback loop has a high bandwidth for effectively rejecting noise from the input source. The pair of PMOS transistors preferably operate in the triode region for efficiency.

The second feedback loop is responsible for regulating the output voltage. It comprises a transconductance amplifier that controls the second current with feedback such that the first current charges the output capacitor to the desired output voltage level. The transconductance amplifier is compensated to ensure that the second feedback loop is stable. The second feedback loop has a lower bandwidth than the first loop because the bandwidth of the second loop is dominated by a relatively large output capacitance and compensation capacitance, while the bandwidth of the first feedback loop is dominated by the relatively small gate capacitances of the pair of transistors and a relatively small compensation capacitance. The second feedback loop, however, generally requires less bandwidth to maintain a constant output voltage than the first feedback loop requires to reject high frequency noise.

Therefore, the invention effectively separates ripple rejection and output voltage level regulation into two feedback loops. Each loop is separately optimized for its respective bandwidth requirements and, therefore, the regulator effectively suppresses noise from its input source while drawing a minimum of power.

DETAILED DESCRIPTION OF THE PREFERRED EMBODIMENT

Figure 2:
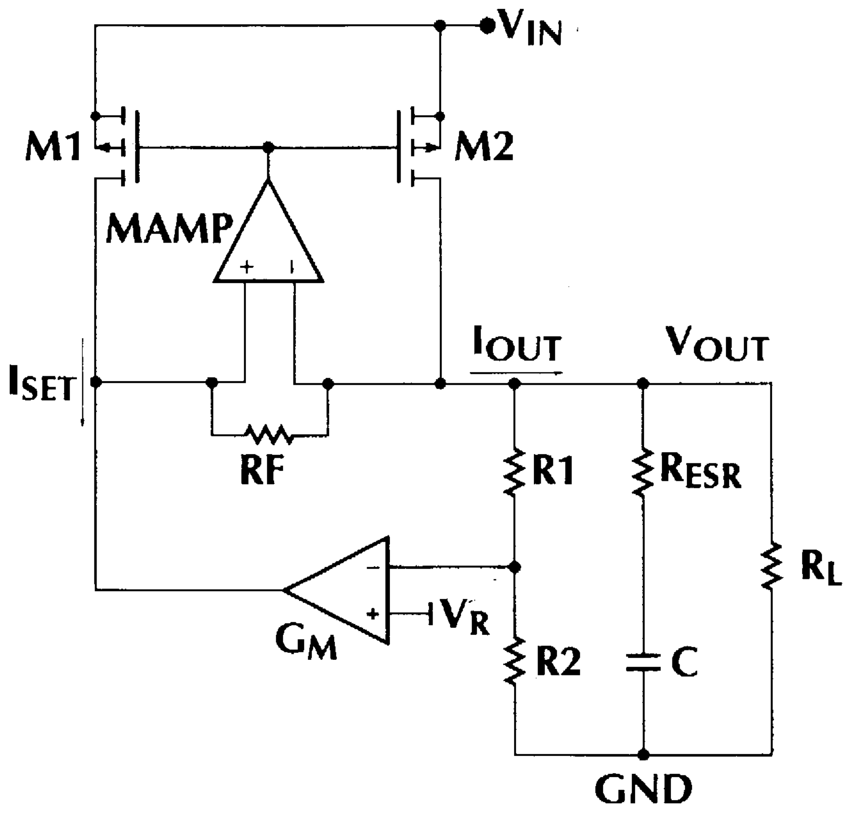
FIG. 2 shows a schematic diagram of a low drop-out regulator according to the present invention.

FIG. 2 shows a schematic diagram of a low drop-out regulator according to the present invention. It is anticipated that the invention will be incorporated into an integrated circuit available from Micro Linear Corporation, located at 2092 Concourse Drive, in San Jose, Calif., Zip Code 95131, under part number ML4891.

An input voltage source is coupled to a node Vin. A source of a PMOS transistor M1 and a source of a PMOS transistor M2 are coupled to the node Vin. A gate of the transistor M1 is coupled to a gate of the transistor M2 and to an output of an amplifier MAMP. A drain of the transistor M1 is coupled to a non-inverting input to the amplifier MAMP, to a first terminal of a resistor RF and to an output of a transconductance amplifier Gm. A drain of the transistor M2 is coupled to an inverting input to the amplifier MAMP, to a second terminal of the resistor RF, to a first terminal of a resistor R1, to a first terminal of a capacitor C and to a first terminal of a load RL.

The capacitor C has an effective series resistance, shown as a resistor Resr coupled in series with the capacitor C. A second terminal of the resistor R1 is coupled to an inverting input to the transconductance amplifier Gm and to a first terminal of a resistor R2. A non-inverting input to the transconductance amplifier Gm is coupled to a reference voltage source Vr. A second terminal of the capacitor C is coupled to a second terminal of the load RL, to a second terminal of the resistor R2 and to a ground node.

The amplifier MAMP tends to maintain the voltages at its inputs at an equal level. Thus, the amplifier MAMP tends to maintain the voltage at the drain of the transistor M1 equal to the voltage at the drain of the transistor M2. Because the gate of the transistor M1 is coupled to the gate of the transistor M2, each transistor has the same gate voltage. Also, because the source of the transistor M1 is coupled to the source of the transistor M2, each transistor has the same source voltage. Thus, gate-to-source voltage of the transistor M1 is equal to the gate-to-source voltage of the transistor M2. Preferably, the transistor M1 has an aspect ratio that is smaller than the aspect ratio of the transistor M2. The aspect ratio of M2 is a constant K multiplied by the aspect ratio of the transistor M1. Therefore, the current Iout, through the transistor M2, is K times the current Iset, through the transistor M1 (i.e. Iout is proportional to, and larger than, Iset). This reduces the current requirements of the transconductance amplifier Gm by allowing the transconductance amplifier Gm to draw only a portion of the current that the load RL requires. Thus, the amplifier MAMP and the transistors M1, M2 form an active current mirror with current gain.

The resistor RF enhances the performance of the circuit by improving the stability of the circuit. When the input voltage Vin is much greater than the output voltage Vout of the regulator, the PMOS transistors M1 and M2, will be in the high gain saturation region as opposed to the triode region. During this mode of operation, the resistor RF provides a finite resistive load to the PMOS transistor M1, thus, limiting its gain. By limiting the gain of the PMOS transistor M1 with the resistor RF, the active current mirror remains stable when the input voltage Vin is much larger than the output voltage Vout. The resistor RF can be omitted in cases where the difference between the input voltage Vin and the output voltage Vout is small enough that the PMOS transistors M1 and M2, are in the triode region.

The transconductance amplifier Gm controls the current Iset based upon a difference between the voltage at the inverting input to the transconductance amplifier Gm and the voltage Vr at the non-inverting input to the transconductance amplifier Gm. The current Iout charges the capacitor C for providing power to the load RL. A voltage divider comprising the resistors R1 and R2 forms a voltage at the inverting input to the transconductance amplifier Gm that is proportional to the voltage at the output node Vout. Thus, the output voltage is given by $Vout=Vr(1+R1/R2)$.

The amplifier MAMP and the transistors M1 and M2 form a first feedback loop to maintain Iout proportional to Iset while drawing power from the source coupled to the node Vin. This first feedback loop is responsible for attenuating noise from the power source coupled to the node Vin. The bandwidth of the first feedback loop is dominated by the gate capacitances of the transistors M1 and M2 and by compensation capacitance (not shown) in the amplifier MAMP.

The first feedback loop may be viewed as comprising two loops; a negative feedback loop and a positive feedback loop. The negative feedback loop comprises the transistor M1 and the non-inverting input to the amplifier MAMP, whereas, the positive feedback loop comprises the transistor M2 and the inverting input to the amplifier MAMP. For example, if the voltage at the non-inverting input to the amplifier MAMP increases, the output of the amplifier MAMP will tend to increase. This will decrease the current through the transistor MP1 causing the voltage at the non-inverting input to the amplifier MAMP to decrease. Therefore, a negative feedback loop is described. In contrast, if the voltage at the inverting input to the amplifier MAMP increases, the output of the amplifier MAMP will tend to decrease. This will increase the current through the transistor M2 causing the voltage at the inverting input to the amplifier MAMP to increase further. Therefore, a positive feedback loop is described.

The transconductance amplifier Gm, the resistors R1 and R2, and the capacitor C form a second feedback loop for controlling the output voltage Vout. The bandwidth of this second feedback loop is dominated by the capacitor C and the compensation capacitance of the transconductance amplifier Gm.

The gate capacitances of the transistors M1 and M2 and the compensation capacitance of the amplifier MAMP are relatively small in comparison to the capacitor C and the compensation capacitance of the transconductance amplifier Gm. Thus, the first feedback loop has a higher bandwidth and faster response time than does the second feedback loop. This allows the first feedback loop to attenuate high frequency noise from the power source without requiring high power consumption in the first feedback loop. The second feedback loop can have a lower bandwidth than would be required without the noise attenuation of the first feedback loop such that the power consumption of the transconductance amplifier in the second feedback loop can be kept low despite the relatively large output capacitance C.

Figure 1:
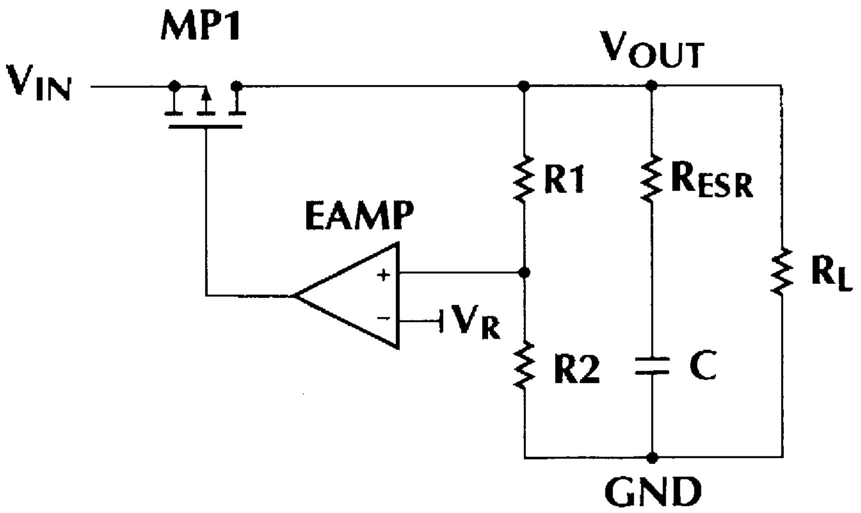
FIGURE 1 (Prior Art)
FIG. 1 shows a schematic diagram of a prior art low drop-out regulator.

In other terms, noise from the power source coupled to the node Vin is attenuated by a voltage divider comprising the output resistance Rout of the active current mirror and the effective series resistance Resr. Input noise in the prior art regulator (FIG. 1) is attenuated by a voltage divider comprising the on-resistance Ron of the transistor MP1 and the effective series resistance Resr. Thus, attenuation of input noise according to the present invention is improved in contrast to the prior art because Rout is much greater than Ron (i.e. $Rout>>Ron$).

Figure 3:
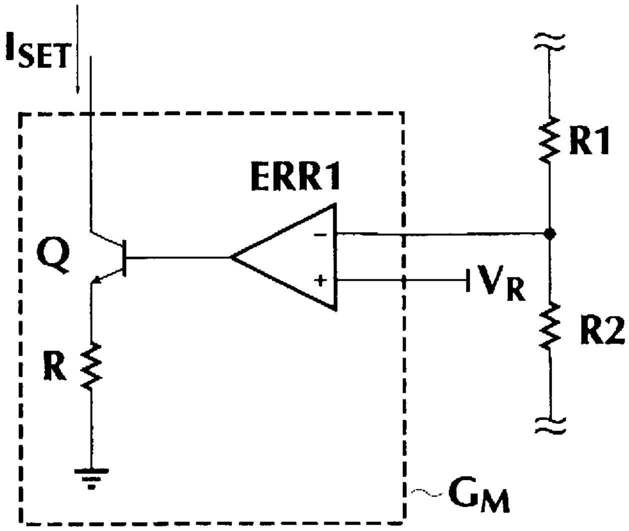
FIG. 3 shows a more detailed schematic diagram of the transconductance amplifier Gm of FIG. 2.

FIG. 3 shows a more detailed schematic diagram of the transconductance amplifier Gm of FIG. 2. A non-inverting input to an amplifier ERR1 is coupled to the reference voltage Vr. An inverting input of the amplifier ERR1 is coupled between the resistors R1 and R2. The resistors R1 and R2 shown in FIG. 3 correspond to the resistors R1 and R2 of FIG. 2. An output of the amplifier ERR1 drives the base of a transistor Q. A current Iset flowing into a collector of the transistor Q corresponds to the current Iset shown in FIG. 2.

Figure 4:
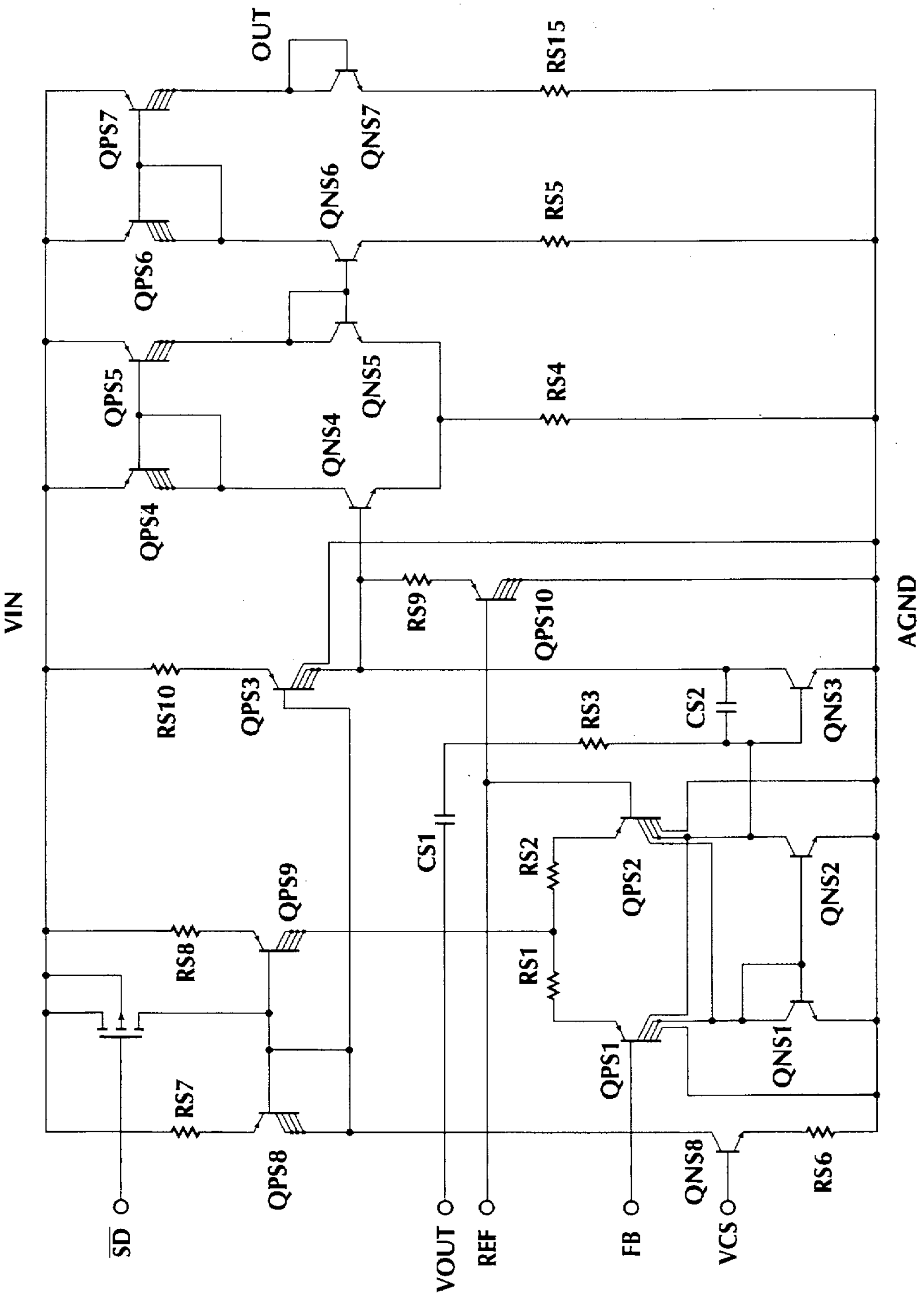
FIG. 4 shows a more detailed schematic diagram of the amplifier ERR1 of FIG. 3.
Figure 5:
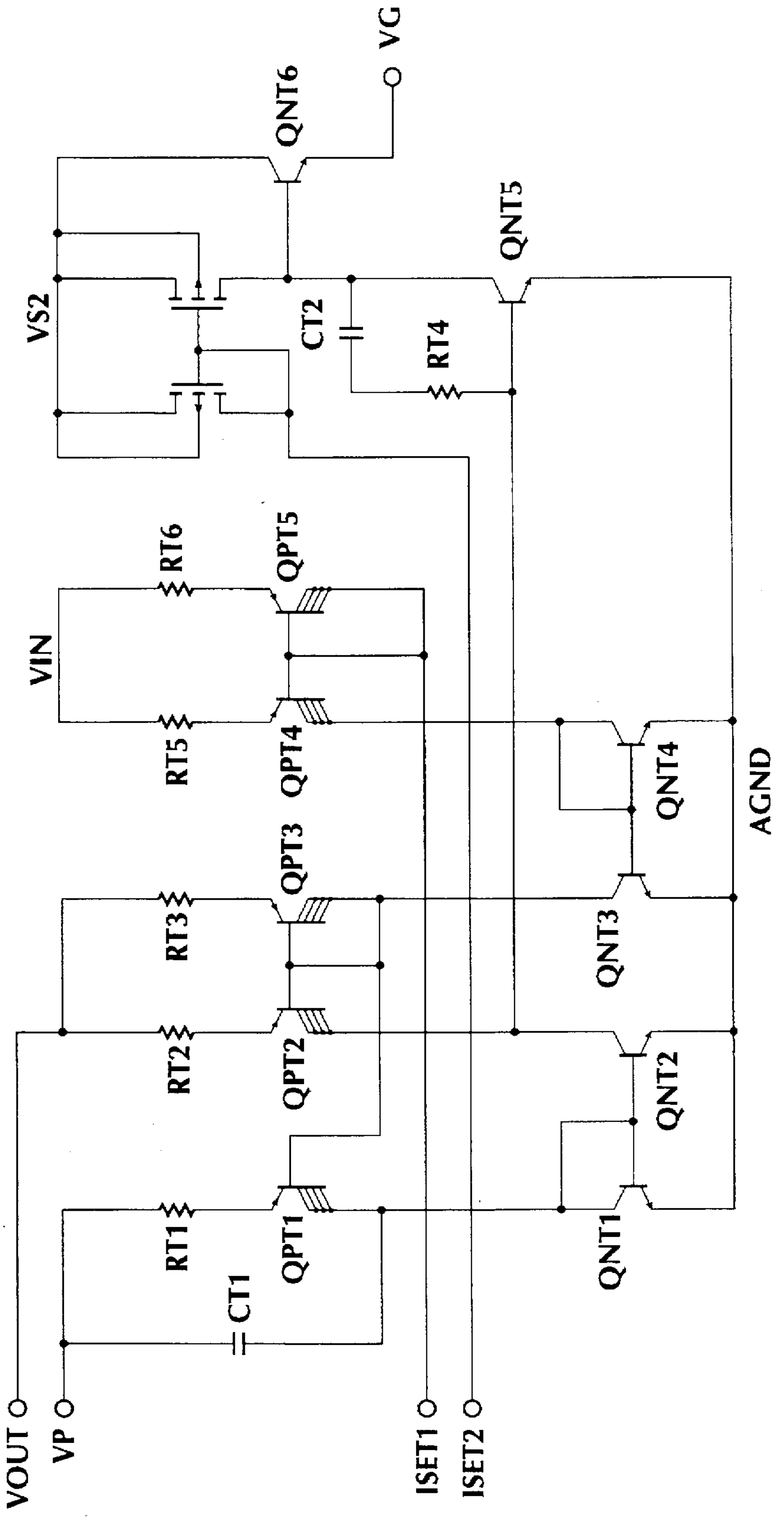
FIG. 5 shows a more detailed schematic diagram of the amplifier MAMP of FIG. 2.
Figure 6:
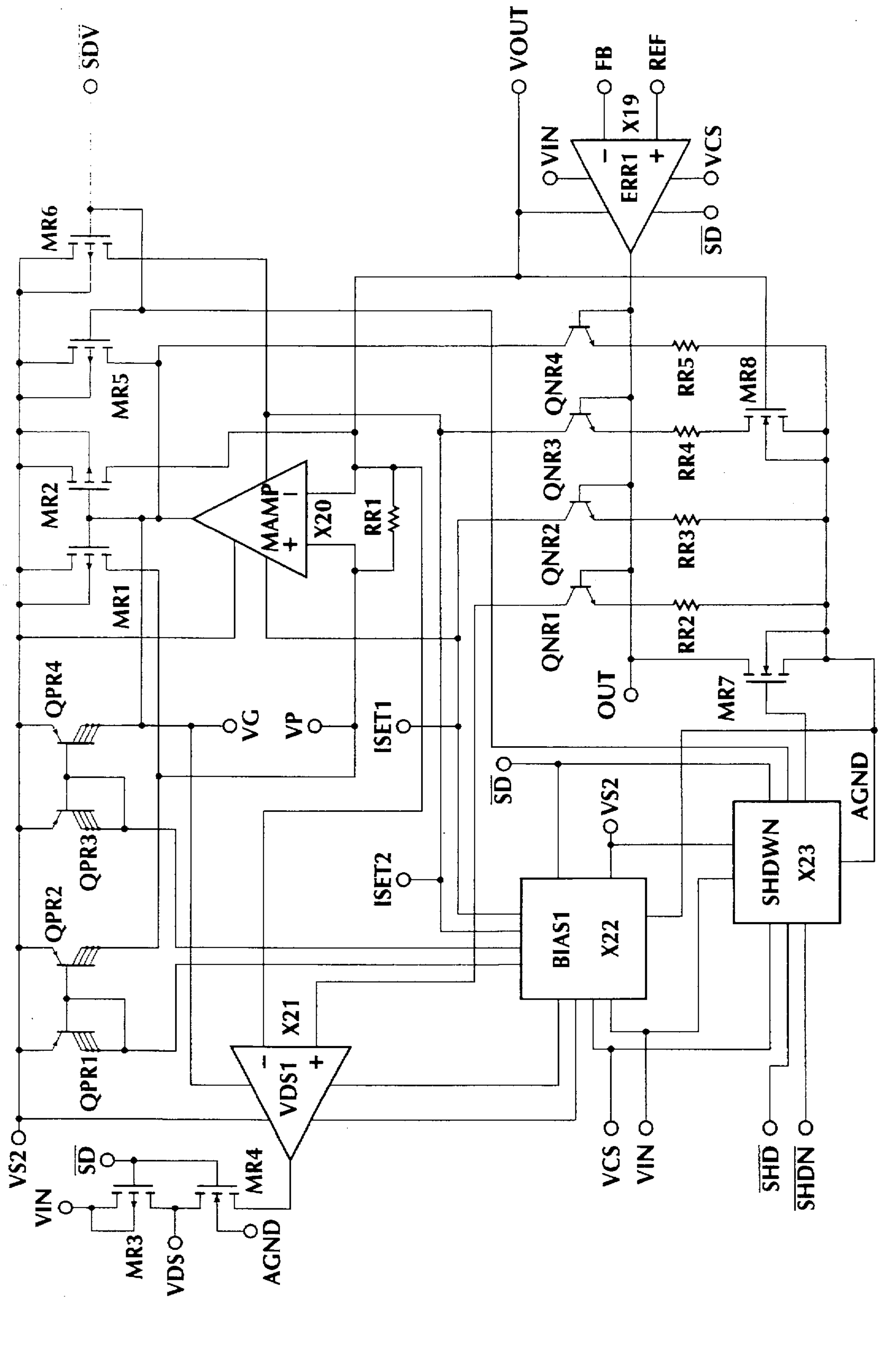
FIG. 6 shows a more detailed schematic diagram of the low drop-out regulator of FIG. 2 including the amplifiers MAMP and ERR1.

FIG. 4. shows a more detailed schematic diagram of the amplifier ERR1 shown in FIG. 3. FIG. 5 shows a more detailed schematic diagram of the amplifier MAMP of FIG. 2. FIG. 6 shows a more detailed schematic diagram of the low drop-out regulator of FIG. 2 including the amplifiers MAMP and ERR1.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth.

What is claimed is:

1. A voltage regulator comprising:

a. a first feedback loop for attenuating noise from a power source having a first bandwidth; and b. a second feedback loop including a capacitor and having a second bandwidth is coupled to the first feedback loop for generating an output voltage across the capacitor wherein the second bandwidth is limited by a capacitance of the capacitor and the first bandwidth is independent of the capacitance.

2. The voltage regulator according to claim 1 wherein the first bandwidth is greater than the second bandwidth.

3. The voltage regulator according to claim 1 wherein the first feedback loop comprises an active current mirror wherein the active current mirror has an output resistance that is greater than an on-resistance of a transistor.

4. A voltage regulator comprising:

a. a current mirror for forming a first current wherein the first current is proportional to a second current;

b. a capacitor coupled to receive the first current for forming an output voltage; and c. a transconductor coupled to generate the second current based upon a comparison of the output voltage to a reference voltage.

5. The voltage regulator according to claim 4 wherein the current mirror has an output resistance that is greater than an on-resistance of a transistor.

6. The voltage regulator according to claim 4 wherein the current mirror comprises a first feedback loop, the first feedback loop for maintaining the first current proportional to the second current and wherein the transconductor comprises a second feedback loop, the second feedback loop for maintaining the output voltage at a predetermined level.

7. The voltage regulator according to claim 6 wherein the first feedback loop comprises two loops including a negative feedback loop and a positive feedback loop.

8. The voltage regulator according to claim 6 wherein the first feedback loop has a first bandwidth and the second circuit has a second bandwidth and further wherein the first bandwidth is higher than the second bandwidth.

9. The voltage regulator according to claim 6 wherein the first feedback loop has a first response time for controlling the first current and the second feedback loop has a second response time for controlling the second current wherein first response time is shorter than the second response time.

10. A voltage regulator comprising:

a. a first circuit for forming a first current wherein the first current is proportional to a second current; and b. a second circuit for generating the second current coupled to receive the first current wherein the second circuit controls the second current such that the first current charges a storage element to a predetermined voltage level for powering a load.

11. The voltage regulator according to claim 10 wherein the first circuit comprises a current mirror.

12. The voltage regulator according to claim 11 wherein the current mirror has an output resistance that is greater than an on-resistance of a transistor.

13. The voltage regulator according to claim 11 wherein the current mirror is coupled to receive power from a power source wherein the power source comprises a switching regulator.

14. The voltage regulator according to claim 10 wherein the second circuit comprises a transconductance amplifier coupled to generate the second current based upon a comparison of a voltage representative of an output voltage to a reference voltage.

15. The voltage regulator according to claim 10 wherein the first circuit comprises a first feedback loop for maintaining the first current proportional to the second current and wherein the second circuit comprises a second feedback loop for maintaining the output voltage at the predetermined level.

16. The voltage regulator according to claim 15 wherein the first feedback loop has a first bandwidth and the second circuit has a second bandwidth and further wherein the first bandwidth is higher than the second bandwidth.

17. The voltage regulator according to claim 15 wherein the first feedback loop has a first response time for controlling the first current and the second feedback loop has a second response time for controlling the second current wherein first response time is shorter than the second response time.

18. A method of regulating a voltage comprising the steps of:

a. forming a first current according to a difference between a voltage representative of an output voltage and a reference voltage;

b. forming a second current wherein the second current is proportional to the first current; and c. charging a capacitor with the second current for forming the output voltage.

19. The method according to claim 18 wherein a response time for the step of forming the second current is shorter than a response time for the step of forming the first current.

20. The method according to claim 19 wherein the response time for the step of forming the first current is dependent upon a capacitance of the capacitor and the response time for the step of forming the second current is independent of the capacitance.

21. A voltage regulator comprising:

a. a first transistor having a first source, a first drain and a first gate;

b. a second transistor having a second source, a second drain and a second gate, wherein the first source is coupled to the second source;

c. an amplifier having a first amplifier input, a second amplifier input and an amplifier output, wherein the first drain is coupled to the first amplifier input, the second drain is coupled to the second amplifier input and the amplifier output is coupled to the first gate and to the second gate;

d. a first resistor having a first terminal and a second terminal wherein the first terminal of the first resistor is coupled to the second drain;

e. a transconductance amplifier having a first transconductance input, a second transconductance input and a transconductance output wherein the first transconductance input is coupled to the second terminal of the first resistor, the second transconductance input is coupled to receive a reference voltage level and the transconductance output is coupled to the first drain;

f. a second resistor having a first terminal and a second terminal wherein the first terminal of the second resistor is coupled to the second terminal of the first resistor and the second terminal of the second resistor is coupled to a ground node; and g. a capacitor having a first terminal and a second terminal wherein the first terminal of the capacitor is coupled to the second drain and the second terminal of the capacitor is coupled to the ground node.

22. The regulator according to claim 21 further comprising a load coupled across the capacitor.

23. The regulator according to claim 21 further comprising a third resistor having a first terminal and second terminal wherein a first terminal of the third resistor is coupled to the first amplifier input and the second terminal of the third resistor is coupled to the second amplifier input.

24. The regulator according to claim 21 wherein the first transistor has an aspect ratio that is smaller than an aspect ratio of the second transistor.

* * * * *